United States Patent
Bakke et al.

(10) Patent No.: US 7,451,208 B1
(45) Date of Patent: Nov. 11, 2008

(54) SYSTEMS AND METHODS FOR NETWORK ADDRESS FAILOVER

(75) Inventors: Mark A. Bakke, Maple Grove, MN (US); David P. Thompson, Rogers, MN (US)

(73) Assignee: Cisco Technology, Inc., San Jose, CA (US)

( * ) Notice: Subject to any disclaimer, the term of this patent is extended or adjusted under 35 U.S.C. 154(b) by 935 days.

(21) Appl. No.: 10/607,830

(22) Filed: Jun. 28, 2003

(51) Int. Cl.
*G06F 15/173* (2006.01)

(52) U.S. Cl. .................. 709/224; 709/220; 709/221; 709/245

(58) Field of Classification Search .................. 709/224, 709/220–222, 238–239, 245, 250
See application file for complete search history.

(56) References Cited

U.S. PATENT DOCUMENTS

| | | | |
|---|---|---|---|
| 4,495,617 A | 1/1985 | Ampulski et al. | |
| 5,390,326 A | 2/1995 | Shah | |
| 5,461,608 A | 10/1995 | Yoshiyama | |
| 5,473,599 A | 12/1995 | Li et al. | |
| 5,535,395 A | 7/1996 | Tipley et al. | |
| 5,544,077 A | 8/1996 | Hershey | |
| 5,579,491 A | 11/1996 | Jeffries et al. | |
| 5,600,828 A | 2/1997 | Johnson et al. | |
| 5,666,486 A | 9/1997 | Alfieri et al. | |
| 5,732,206 A | 3/1998 | Mendel | |
| 5,812,821 A | 9/1998 | Sugi et al. | |
| 5,832,299 A | 11/1998 | Wooten | |
| 5,850,573 A | 12/1998 | Wada | |
| 5,870,571 A | 2/1999 | Duburcq et al. | |
| 5,909,544 A | 6/1999 | Anderson et al. | |
| 5,935,215 A * | 8/1999 | Bell et al. | 709/239 |
| 5,941,972 A | 8/1999 | Hoese et al. | |
| 5,951,683 A | 9/1999 | Yuuki et al. | |
| 5,991,813 A | 11/1999 | Zarrow | |
| 5,996,024 A | 11/1999 | Blumenau | |
| 5,996,027 A | 11/1999 | Volk et al. | |
| 6,006,259 A | 12/1999 | Adelman et al. | |
| 6,009,476 A | 12/1999 | Flory et al. | |
| 6,009,480 A | 12/1999 | Pleso | |
| 6,018,765 A | 1/2000 | Durana et al. | |

(Continued)

OTHER PUBLICATIONS

*VMware™ ESX Server: User's Manual*, Version 1.0, [online]. [archived on Jun. 8, 2001]. Retrieved from the Internet: <http://web.archive.org/web/20010608201203/www.vmware.com/support>, 122-124.

(Continued)

*Primary Examiner*—Philip B Tran
(74) *Attorney, Agent, or Firm*—Schwegman, Lundberg & Woessner, P.A.

(57) ABSTRACT

Systems and methods provide network address failover capability within an application gateway device. In one aspect, a system has a first network interface and a second network interface. The system receives a set of configuration data, the configuration data may include a first network address for the first network interface and a second network address for the second network interface. At startup or during later operation, the system may detect the failure of the first network interface. The configuration data may be analyzed to determine if the first network address can be used on the second network interface. If so, the first network address is moved from the first network interface to the second network interface.

41 Claims, 5 Drawing Sheets

U.S. PATENT DOCUMENTS

| | | | |
|---|---|---|---|
| 6,041,381 A | 3/2000 | Hoese | |
| 6,078,957 A | 6/2000 | Adelman et al. | |
| 6,108,300 A | 8/2000 | Coile et al. | |
| 6,108,699 A | 8/2000 | Moiin | |
| 6,131,119 A | 10/2000 | Fukui | |
| 6,134,673 A | 10/2000 | Chrabaszcz | |
| 6,145,019 A | 11/2000 | Firooz et al. | |
| 6,151,297 A * | 11/2000 | Congdon et al. | 370/216 |
| 6,163,855 A | 12/2000 | Shrivastava et al. | |
| 6,178,445 B1 | 1/2001 | Dawkins et al. | |
| 6,185,620 B1 | 2/2001 | Weber et al. | |
| 6,195,687 B1 | 2/2001 | Greaves et al. | |
| 6,195,760 B1 | 2/2001 | Chung et al. | |
| 6,209,023 B1 | 3/2001 | Dimitroff et al. | |
| 6,219,771 B1 | 4/2001 | Kikuchi et al. | |
| 6,268,924 B1 | 7/2001 | Koppolu et al. | |
| 6,269,396 B1 | 7/2001 | Shah et al. | |
| 6,314,526 B1 | 11/2001 | Arendt et al. | |
| 6,343,320 B1 | 1/2002 | Fairchild et al. | |
| 6,353,612 B1 | 3/2002 | Zhu et al. | |
| 6,363,416 B1 | 3/2002 | Naeimi et al. | |
| 6,378,025 B1 | 4/2002 | Getty | |
| 6,392,990 B1 * | 5/2002 | Tosey et al. | 370/218 |
| 6,393,583 B1 | 5/2002 | Meth et al. | |
| 6,400,730 B1 | 6/2002 | Latif et al. | |
| 6,421,753 B1 | 7/2002 | Hoese et al. | |
| 6,425,035 B2 | 7/2002 | Hoese et al. | |
| 6,425,036 B2 | 7/2002 | Hoese et al. | |
| 6,449,652 B1 | 9/2002 | Blumenau et al. | |
| 6,470,382 B1 | 10/2002 | Wang et al. | |
| 6,470,397 B1 | 10/2002 | Shah et al. | |
| 6,473,803 B1 | 10/2002 | Stern et al. | |
| 6,480,901 B1 | 11/2002 | Weber et al. | |
| 6,484,245 B1 | 11/2002 | Sanada et al. | |
| 6,553,408 B1 | 4/2003 | Merrell et al. | |
| 6,560,630 B1 * | 5/2003 | Vepa et al. | 709/250 |
| 6,574,755 B1 | 6/2003 | Seon | |
| 6,591,310 B1 | 7/2003 | Johnson | |
| 6,597,956 B1 | 7/2003 | Aziz et al. | |
| 6,606,690 B2 | 8/2003 | Padovano | |
| 6,640,278 B1 | 10/2003 | Nolan et al. | |
| 6,654,830 B1 | 11/2003 | Taylor et al. | |
| 6,658,459 B1 | 12/2003 | Kwan et al. | |
| 6,665,702 B1 * | 12/2003 | Zisapel et al. | 709/238 |
| 6,678,721 B1 | 1/2004 | Bell | |
| 6,683,883 B1 | 1/2004 | Czeiger et al. | |
| 6,691,244 B1 | 2/2004 | Kampe et al. | |
| 6,697,924 B2 | 2/2004 | Swank | |
| 6,701,449 B1 | 3/2004 | Davis et al. | |
| 6,718,361 B1 | 4/2004 | Basani et al. | |
| 6,718,383 B1 * | 4/2004 | Hebert | 709/224 |
| 6,721,907 B2 | 4/2004 | Earl | |
| 6,724,757 B1 | 4/2004 | Zadikian et al. | |
| 6,728,780 B1 * | 4/2004 | Hebert | 709/239 |
| 6,738,854 B2 | 5/2004 | Hoese et al. | |
| 6,748,550 B2 | 6/2004 | McBrearty et al. | |
| 6,757,291 B1 | 6/2004 | Hu | |
| 6,760,783 B1 | 7/2004 | Berry | |
| 6,763,195 B1 | 7/2004 | Willebrand et al. | |
| 6,763,419 B2 | 7/2004 | Hoese et al. | |
| 6,766,520 B1 | 7/2004 | Rieschl et al. | |
| 6,771,663 B1 | 8/2004 | Jha | |
| 6,771,673 B1 | 8/2004 | Baum et al. | |
| 6,779,016 B1 | 8/2004 | Aziz et al. | |
| 6,785,742 B1 | 8/2004 | Teow et al. | |
| 6,789,152 B2 | 9/2004 | Hoese et al. | |
| 6,799,316 B1 | 9/2004 | Aguilar et al. | |
| 6,807,581 B1 | 10/2004 | Starr et al. | |
| 6,823,418 B2 | 11/2004 | Langendorf et al. | |
| 6,839,752 B1 | 1/2005 | Miller et al. | |
| 6,845,403 B2 * | 1/2005 | Chadalapaka | 710/5 |
| 6,848,007 B1 | 1/2005 | Reynolds et al. | |
| 6,856,591 B1 | 2/2005 | Ma et al. | |
| 6,859,462 B1 | 2/2005 | Mahoney et al. | |
| 6,874,147 B1 * | 3/2005 | Diamant | 709/220 |
| 6,877,044 B2 | 4/2005 | Lo et al. | |
| 6,885,633 B1 * | 4/2005 | Mikkonen | 370/220 |
| 6,886,171 B2 | 4/2005 | MacLeod | |
| 6,895,461 B1 | 5/2005 | Thompson | |
| 6,920,491 B2 | 7/2005 | Kim | |
| 6,938,092 B2 * | 8/2005 | Burns | 709/245 |
| 6,941,396 B1 | 9/2005 | Thorpe et al. | |
| 6,944,785 B2 | 9/2005 | Gadir et al. | |
| 6,976,134 B1 | 12/2005 | Lolayekar et al. | |
| 6,985,490 B2 | 1/2006 | Czeiger et al. | |
| 7,043,727 B2 | 5/2006 | Bennett et al. | |
| 7,089,293 B2 | 8/2006 | Grosner et al. | |
| 7,120,837 B1 | 10/2006 | Ferris | |
| 7,146,233 B2 | 12/2006 | Aziz et al. | |
| 7,165,258 B1 | 1/2007 | Kuik et al. | |
| 2001/0020254 A1 | 9/2001 | Blumenau et al. | |
| 2002/0010750 A1 | 1/2002 | Baretzki | |
| 2002/0010812 A1 | 1/2002 | Hoese et al. | |
| 2002/0023150 A1 * | 2/2002 | Osafune et al. | 709/221 |
| 2002/0042693 A1 | 4/2002 | Kampe et al. | |
| 2002/0049845 A1 | 4/2002 | Sreenivasan et al. | |
| 2002/0052986 A1 | 5/2002 | Hoese et al. | |
| 2002/0055978 A1 | 5/2002 | Joon-Bo et al. | |
| 2002/0059392 A1 | 5/2002 | Ellis | |
| 2002/0065872 A1 | 5/2002 | Genske et al. | |
| 2002/0103943 A1 | 8/2002 | Lo et al. | |
| 2002/0116460 A1 | 8/2002 | Treister et al. | |
| 2002/0126680 A1 | 9/2002 | Inagaki et al. | |
| 2002/0156612 A1 | 10/2002 | Schulter et al. | |
| 2002/0161950 A1 | 10/2002 | Hoese et al. | |
| 2002/0176434 A1 | 11/2002 | Yu et al. | |
| 2002/0188657 A1 | 12/2002 | Traversat et al. | |
| 2002/0188711 A1 | 12/2002 | Meyer et al. | |
| 2002/0194428 A1 | 12/2002 | Green | |
| 2003/0005068 A1 | 1/2003 | Nickel et al. | |
| 2003/0014462 A1 | 1/2003 | Bennett et al. | |
| 2003/0018813 A1 | 1/2003 | Antes et al. | |
| 2003/0018927 A1 | 1/2003 | Gadir et al. | |
| 2003/0058870 A1 | 3/2003 | Mizrachi et al. | |
| 2003/0084209 A1 | 5/2003 | Chadalapaka | |
| 2003/0093541 A1 | 5/2003 | Lolayekar et al. | |
| 2003/0093567 A1 | 5/2003 | Lolayekar et al. | |
| 2003/0097607 A1 | 5/2003 | Bessire | |
| 2003/0131157 A1 | 7/2003 | Hoese et al. | |
| 2003/0145108 A1 * | 7/2003 | Joseph et al. | 709/239 |
| 2003/0145116 A1 | 7/2003 | Moroney et al. | |
| 2003/0149829 A1 | 8/2003 | Basham et al. | |
| 2003/0163682 A1 | 8/2003 | Kleinsteiber et al. | |
| 2003/0182422 A1 | 9/2003 | Bradshaw et al. | |
| 2003/0182455 A1 | 9/2003 | Hetzler et al. | |
| 2003/0208579 A1 | 11/2003 | Brady et al. | |
| 2003/0210686 A1 | 11/2003 | Terrell et al. | |
| 2003/0212898 A1 | 11/2003 | Steele et al. | |
| 2003/0229690 A1 | 12/2003 | Kitani et al. | |
| 2003/0233427 A1 | 12/2003 | Taguchi | |
| 2003/0236988 A1 | 12/2003 | Snead | |
| 2004/0022256 A1 | 2/2004 | Green | |
| 2004/0024778 A1 | 2/2004 | Cheo | |
| 2004/0064553 A1 | 4/2004 | Kjellberg | |
| 2004/0085893 A1 | 5/2004 | Wang et al. | |
| 2004/0117438 A1 | 6/2004 | Considine et al. | |
| 2004/0141468 A1 | 7/2004 | Christensen | |
| 2004/0148376 A1 | 7/2004 | Rangan et al. | |
| 2004/0233910 A1 | 11/2004 | Chen et al. | |
| 2005/0055418 A1 | 3/2005 | Blanc et al. | |
| 2005/0063313 A1 | 3/2005 | Nanavati et al. | |
| 2005/0268151 A1 | 12/2005 | Hunt et al. | |

2006/0265529 A1  11/2006  Kuik et al.

OTHER PUBLICATIONS

"Cisco SN 5420 Storage Router Hardware Installation Guide", *Cisco Systems, Inc.*, (2001), 98 pgs.

"Cisco SN 5428 Storage Router Hardware Installation Guide", *Cisco Systems Inc.*, (2003). 76 pgs.

"High Availability for Cisco SN 5420 Storage Router-Based iSCSI Solutions", *Cisco Systems, Inc.*, (Jan. 2002), 1-32.

"News Release: Cisco Introduces the Cisco SN 5428 Storage Router", [online]. Retrieved from the Internet: <http://newsroom.cicso.com/dlls/prod_051402b.html>, (May 14, 2002), 3 pgs.

"News Release: Cisco SN 5420 Storage Router Delivers iSCSI to Storage Networking", [online]. Retrieved from the Internet: <http://newsroom.cisco.com/dlls/prod_040901.html, (Apr. 9, 2001), 3 pgs.

Bakker, G., *IP Aliasing*, [online]. [retrieved on Jun. 8, 2005]. Retrieved from the Internet: <http://www.zone-h.org/files/24/ip_aliasing.txt>, (1999), 3 pgs.

Gusella, R., et al. "An Election Algorithm for a Distributed Clock Synchronization Program", *Report No. UCB/CSD 86/257*, University of California, Berkeley, (Dec. 1985), 1-17.

Gusella, R., et al., "The Berkeley UNIX® Time Synchronization Protocol", *UNIX Programmmers Manual 4.3*, vol. 2C, Berkeley Software Distrib., (1986), 10 pgs.

Knight, S., et al., *Virtual Router Redundancy Protocol*, Network Working Group, RFC 2338, Retrieved from the Internet: <http://www.search.ietf.org/rfc/rfc2338.txt>, (1998), 26 pgs.

Lewis, P., "A High-Availability Cluster for Linux", *Linux Journal, 64*, [online]. [retrieved on Oct. 25, 2001]. Retrieved from the Internet: <http://www2.linuxjournal.com/lj-issues/issue64/3247.html>, 11 pgs.

Li, T., et al., *Cisco Hot Standby Router Protocol (HSRP)*, Network Working Group, RFC 2281, [online]. [retrieved on May 10, 2002]. Retrieved from the Internet: <http://www.search.ietf.org/rfc/rfc2281.txt>, (1998), 16 pgs.

Meth, K. Z., et al., "Design of the iSCSI Protocol", *Proceedings of the 20th IEEE Conference on Mass Storage Systems and Technologies*, (Apr. 7-10, 2003), 116-122.

Moore, K., *On the Use of HTTP as a Substrate*, Network Working Group, RFC 3205, [online]. [retrieved on May 10, 2005], Retrieved from the Internet: <http://www.search.ietf.org/rfc/rfc3205.txt>, (2002), 14 pgs.

Satran, J., et al., *iSCSI*, IPS Internet Draft, draft-ietf-ips-iSCSI-12.txt, Category: Standards—track, (Apr. 17, 2002), 260 pgs.

Satran, J., et al., *iSCSI*, IPS Internet Draft, draft-ietf-ips-iSCSI-00, Category: Standards Track, [online]. [retrieved on Nov. 2000]. Retrieved from the Internet: <http://www.haifa.il.ilb.com/satran/ips/draft-ietf-ips-iSCSI-00.txt>, (Nov. 2000), 78 pgs.

Simitchi, H., et al., "Evaluation of SCSP over TCP/IP and SCSI over Fibre Channel Connections", *Hot Interconnects,9*, (Aug. 2001), 87-91.

\* cited by examiner

SYSTEMS AND METHODS FOR NETWORK ADDRESS FAILOVER

RELATED FILES

This invention is related to application Ser. No. 10/128,656, filed Apr. 22, 2002, now U.S. Pat. No. 7,165,258, issued on Jan. 16, 2007, entitled "SCSI-BASED STORAGE AREA NETWORK", application Ser. No. 10/131,793, filed Apr. 22, 2002, entitled "VIRTUAL SCSI BUS FOR SCSI-BASED STORAGE AREA NETWORK", provisional application Ser. No. 60/374,921, filed Apr. 22, 2002, entitled "INTERNET PROTOCOL CONNECTED STORAGE AREA NETWORK", application Ser. No. 10/356,073, filed Jan. 31, 2003, entitled "STORAGE ROUTER WITH INTEGRATED SCSI SWITCH", and application Ser. No. 10/128,657, filed Apr. 22, 2002, entitled "METHOD AND APPARATUS FOR EXCHANGING CONFIGURATION INFORMATION BETWEEN NODES OPERATING IN A MASTER-SLAVE CONFIGURATION" all of the above of which are hereby incorporated by reference.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright© 2003, Cisco Systems, Inc., All Rights Reserved.

FIELD

This invention relates generally to network addressing, and more particularly to providing address failover capability for network interfaces on an application gateway device.

BACKGROUND

Many devices capable of being attached to a network such as personal computers, servers, routers and switches have more than one network interface. Typically multiple network interfaces may be used by the network device to provide connectivity to differing networks or systems, to provide a redundant path to a network, or they may be used to provided increased network throughput (i.e. increased bandwidth).

Occasionally a network interface may fail. When this happens, software applications using the network interface are no longer able to use the network interface to send and receive data, possibly resulting in the failure of the software application.

In some systems, when a network interface fails, the system attempts to migrate the software application to another network device on the same network as the device experiencing the network interface failure. The application then runs on the new network device, often in a manner that is transparent to the users on the system. The ability to migrate an application to a new device is sometimes referred to as "failover."

Failover capability is useful in providing fault tolerant applications, however there are problems associated with failing over to a second network device. Often it takes a substantial amount of time to accomplish the failover, because application configuration and data must be transferred to the second network device. A user will often notice a delay in the response of the system while the failover takes place. In addition, network connections between the failed over application and other hosts and applications may need to be reestablished because the new application will reside on a network device having a different network address than the original network device. This also can take a substantial mount of time and may result in the loss of data.

In view of the above problems and issues, there is a need in the art for the present invention.

SUMMARY

The above-mentioned shortcomings, disadvantages and problems are addressed by the present invention, which will be understood by reading and studying the following specification.

Systems and methods provide network address failover capability within an application gateway device. In one aspect, a system has a first network interface and a second network interface. The system receives a set of configuration data, the configuration data may include a first network address for the first network interface and a second network address for the second network interface. At startup or during later operation, the system may detect the failure of the first network interface. The configuration data may be analyzed to determine if the first network address can be used on the second network interface. If so, the first network address is moved from the first network interface to the second network interface.

The present invention describes systems, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the scope of the present invention.

Some portions of the detailed descriptions that follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component which appears in multiple Figures. Signals and connections may be referred to by the same reference number or label, and the actual meaning will be clear from its use in the context of the description.

The following detailed description is, therefore, not to be taken in a limiting sense, and the scope of the present invention is defined only by the appended claims.

Operating Environment

Figure 1A:
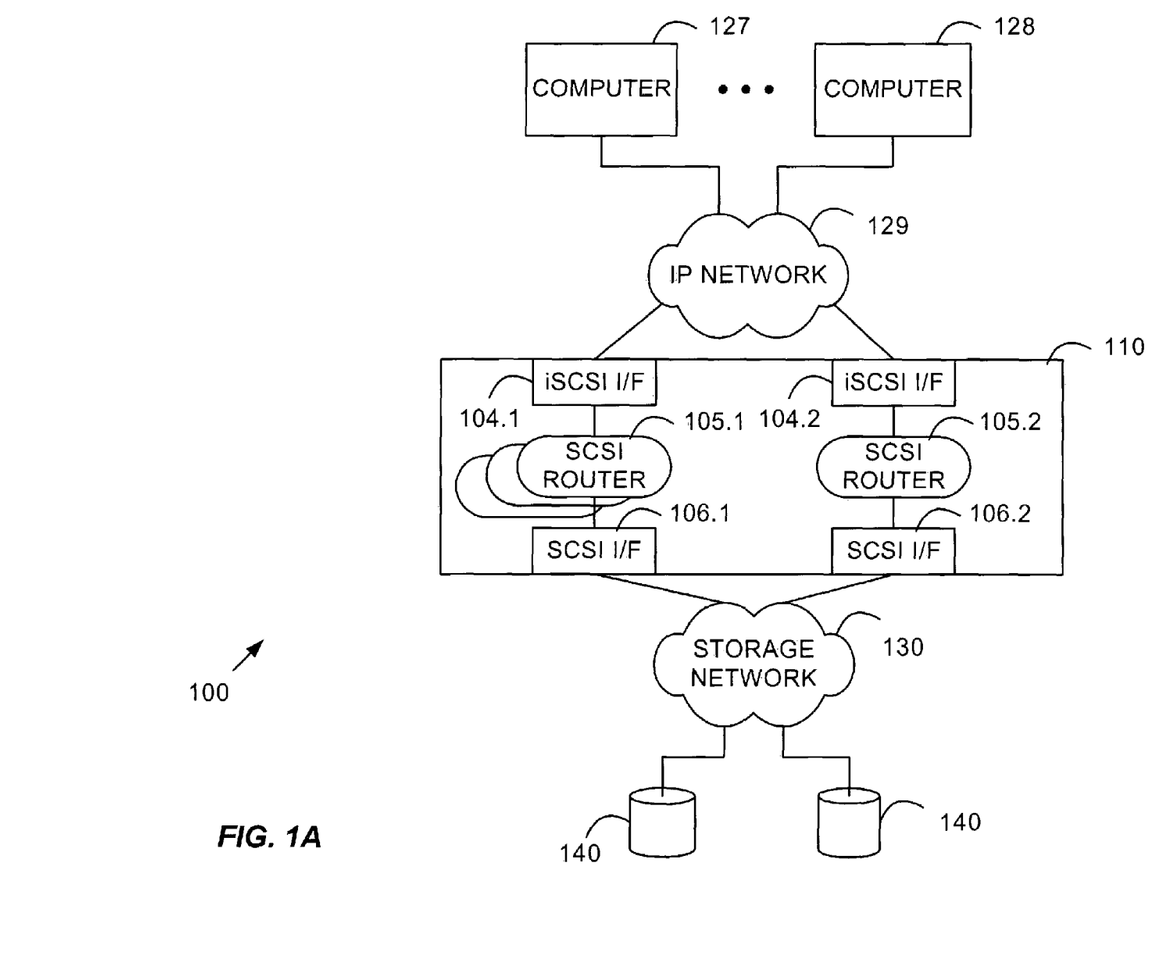
FIG. 1A is a block diagram of a hardware and operating environment for a storage router application gateway device in which different embodiments of the invention can be practiced.

Some embodiments of the invention operate in an environment of systems and methods that provide a means for Fibre Channel based Storage Area Networks (SANs) to be accessed from TCP/IP network hosts. FIG. 1A is a block diagram describing the major components of such a system. In these embodiments, storage router system 100 includes computers (127, 128) connected through an IP network 129 to one or more instances of storage router 110. Storage router 110 comprises an application gateway device that is connected in turn through storage network 130 to one or more SCSI devices 140. In some embodiments, each instances of a storage router 110 may have its own TCP/IP network address. For the purpose of this specification, an application gateway device comprises a device that receives data conforming to a first protocol and processes the data to conform to a second differing protocol. In the embodiment shown in FIG. 1A, storage router 110 includes an iSCSI interface 104, a SCSI router 105 and a SCSI interface 106. iSCSI interface 104 receives encapsulated SCSI packets from IP network 129, extracts the SCSI packet and send the SCSI packet to SCSI router 105. SCSI interface 106 modifies the SCSI packet to conform to its network protocol (e.g., Fibre Channel, parallel SCSI, or iSCSI) and places the modified SCSI packet onto storage network 130. The SCSI packet is then delivered to its designated SCSI device 140.

In one embodiment, storage router 110 provides IPv4 router functionality between a Gigabit Ethernet and a Fibre Channel interface. In one such embodiment, static routes are supported. In addition, storage router 110 supports a configurable MTU size for each interface, and has the ability to reassemble and refragment IP packets based on the MTU of the destination interface.

In one embodiment, storage router 110 acts as a gateway, converting SCSI protocol between Fibre Channel and TCP/IP. Storage router 110 is configured in such an embodiment to present Fibre Channel devices as iSCSI targets, providing the ability for clients on the IP network to directly access storage devices.

In one embodiment, SCSI routing occurs in the Storage Router 110 through the mapping of physical storage devices to iSCSI targets. An iSCSI target (also called logical target) is an arbitrary name for a group of physical storage devices. Mappings between an iSCSI target to multiple physical devices can be established using configuration programs on storage router 110. An iSCSI target always contains at least one Logical Unit Number (LUN). Each LUN on an iSCSI target is mapped to a single LUN on a physical storage target.

In operation, if a network interface on storage router 110 fails, the SCSI router instances using the interface may have their respective IP network addresses failed over to a secondary network interface. For example, assume that the network interface being used by SCSI router 105.2 fails. The IP network address associated with SCSI router 105.2 may be moved (i.e. failed over) to the same network interface as SCSI router 105.1. The movement is generally transparent both to the SCSI router instance 105.2, and to hosts and applications that are communicating via the network to SCSI router instance 105.2. Further details on the failover of the IP network address are provided with reference to FIGS. 3A and 3B below.

Figure 1B:
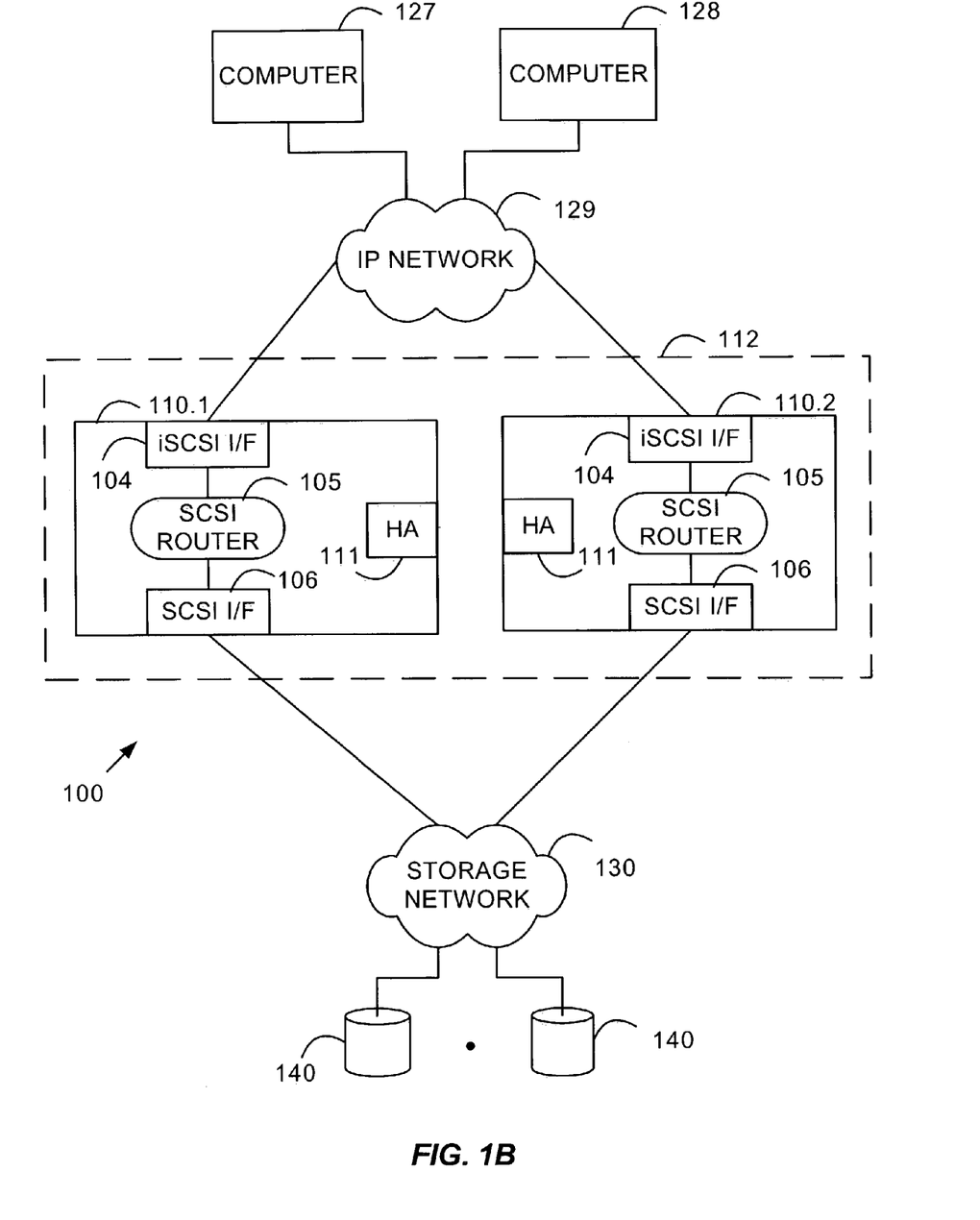
FIG. 1B is a block diagram of a clustered storage router hardware and operating environment in which different embodiments of the invention can be practiced.

FIG. 1B is a block diagram of a clustered storage router hardware and operating environment in which different embodiments of the invention can be practiced. In some embodiments of the invention, high-availability network interface 111 interconnects the storage routers 110 that participate as members in a cluster. In some embodiments, the high-availability network interface 111 is an Ethernet interface, however the invention is not limited to any particular network type. In some embodiments, members of cluster 112 share configuration information and heartbeat information through high availability interface 111. This configuration information may include IP network addresses for each SCSI router instance 105 that is to operate on each storage router 110. In addition, the configuration information may include a primary and secondary network interface for each SCSI router instance.

Although the exemplary environment illustrates two members 110.1 and 110.2 of cluster 112, the invention is not limited to any particular number of members of a cluster.

Further details on the operation of the above can be found in U.S. patent application Ser. No. 10/131,793 entitled "VIRTUAL SCSI BUS FOR SCSI-BASED STORAGE AREA NETWORK" and in U.S. patent application Ser. No. 10/356,073 entitled "INTEGRATED STORAGE ROUTER AND FIBRE CHANNEL SWITCH", both of which have been previously incorporated by reference.

Figure 2:
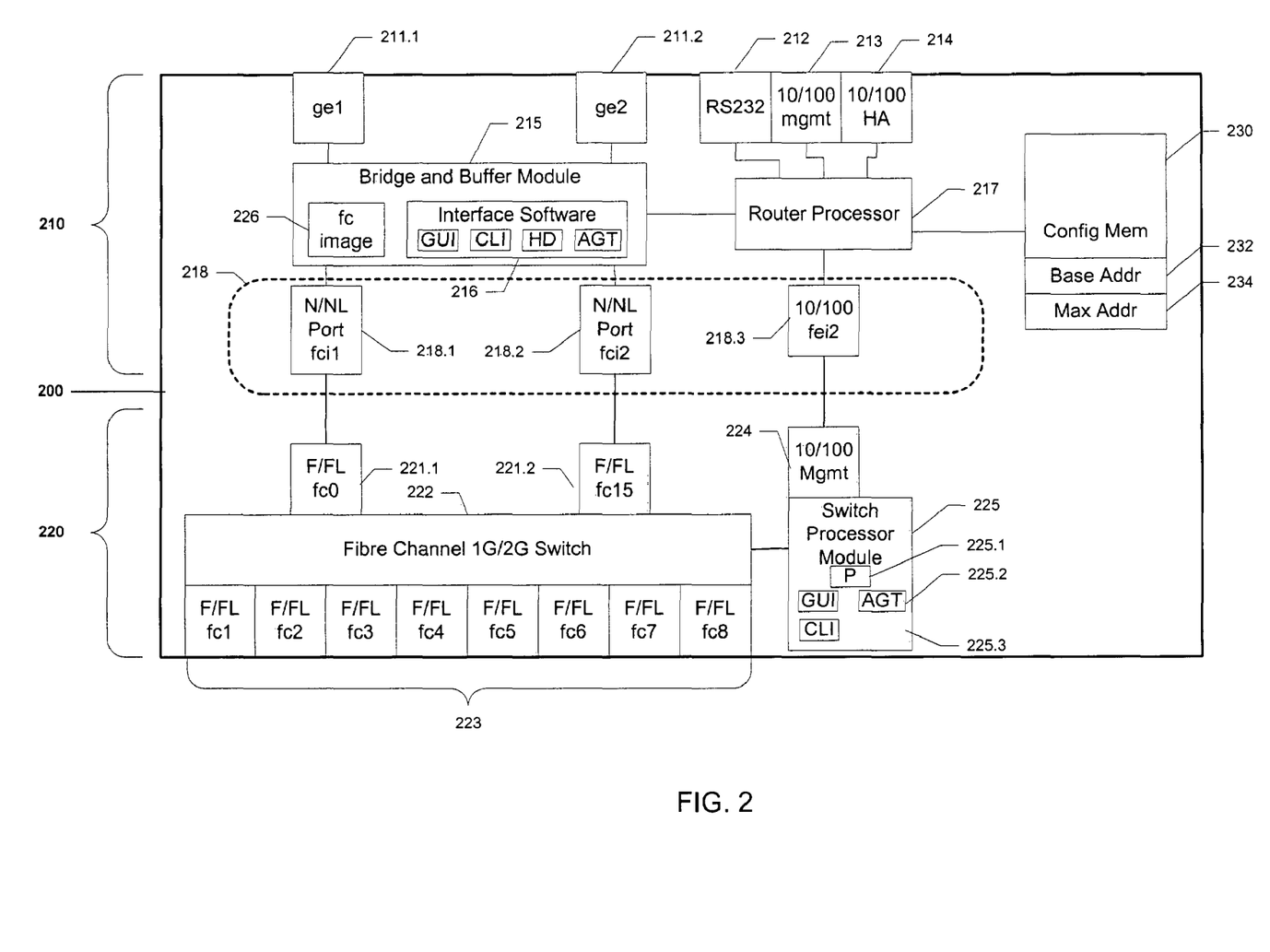
FIG. 2 is a block diagram of the major hardware components of a storage router according to an embodiment of the invention.

FIG. 2 is a block diagram providing further details of the major hardware components comprising storage router 110. In some embodiments, a storage router 110 includes a router portion 210 and a switch portion 220 on a common motherboard 200. The motherboard is powered by a power supply (not shown) and cooled by common cooling system, such as a fan (also not shown).

Router portion 210, which in the exemplary embodiment complies with draft 08 and later versions of the iSCSI protocol and incorporates commercially available router technology, such as the 5420 and 5428 Storage Routers from Cisco Systems, Inc. of San Jose, Calif., includes Gigabit Ethernet (GE) ports 211.1 and 211.2, console port 212, management port 213, high-availability (HA) port 214, bridge-and-buffer module 215, interface software 216, router processor 217, and router-to-switch interface 218.

GE ports 211.1 and 211.2 couple the storage router to an IP network for access by one or more servers or other computers, such as servers or iSCSI hosts (in FIG. 1). In some embodiments, GE ports 211.1 and 211.2 have respective MAC addresses, which are determined according to a base MAC address for the storage router plus 31 minus the respective port number. Two or more Gigabit Ethernet interfaces may be available. In some embodiments, one or more of the Gigabit Ethernet interfaces may provide internal support for maintaining Virtual Local Area Networks (VLANs). Each SCSI router typically supports a single IP address. The SCSI router IP address may be tied to any network (or VLAN) on either GE interface. Generally at least one SCSI router instance is created for each GE interface.

Console port 212 couples to a local control console (not shown). In the exemplary embodiment, this port takes the form of an RS-232 interface.

Management port 213 provides a connection for managing and/or configuring storage router 110. In the exemplary embodiment, this port takes the form of a 10/100 Ethernet port and may be assigned the base MAC address for the router-switch.

HA port 214 provides a physical connection for high-availability communication with another router-switch, such as storage router 110 in FIG. 1. In the exemplary embodiment, this port takes the form of a 10/100 Ethernet port, and is assigned the base MAC address plus 1.

Bridge-and-buffer module 215, which is coupled to GE ports 211.1 and 211.2, provides router services that are compliant with draft 08 and later versions of the iSCSI protocol. In the exemplary embodiment, module 215 incorporates a Peripheral Component Interface (PCI) bridge, such as the GT64260 from Marvell Technology Group, LTD. of Sunnyvale, Calif. Also module 215 includes a 64-megabyte flash file system, a 1-megabyte boot flash, and a 256-megabyte non-volatile FLASH memory (not shown separately.) Configuration memory 230 may be part of the flash file system, the boot flash or the non-volatile flash memory, or it may be a separate non-volatile flash memory. In addition, in alternative embodiments, configuration memory 230 may be part of a hard disk, CD-ROM, DVD-ROM or other persistent memory (not shown). The invention is not limited to any particular type of memory for configuration memory 230.

In addition to data and other software used for conventional router operations, module 215 includes router-switch interface software 216. Router-switch software 216 performs iSCSI routing between servers and the storage devices. The software includes an integrated router-switch command line interface module CLI and a web-based graphical-user-interface module (GUI) for operation, configuration and administration, maintenance, and support of the router-switch 110. Both the command-line interface and the graphical user interface are accessible from a terminal via one or both of the ports 213 and 214. Additionally, to facilitate management activities, interface software 216 includes an SNMP router-management agent AGT and an MIB router handler HD. (SNMP denotes the Simple Network Management Protocol, and MIB denotes Management Information Base (MIB)). The agent and handler cooperate with counterparts in switch portion 220 (as detailed below) to provide integrated management and control of router and switching functions in router-switch 200.

Router Processor 217, in the exemplary embodiment, is implemented as a 533-MHz MPC7410 PowerPC from Motorola, Inc. of Schaumburg, Ill. This processor includes 1-megabyte local L2 cache (not shown separately). In the exemplary embodiment, router processor 217 runs a version of the VX Works operating system from WindRiver Systems, Inc. of Alameda, Calif. To support this operating system, the exemplary embodiment also provides means for isolating file allocations tables from other high-use memory areas (such as areas where log and configuration files are written).

Coupled to router processor 217 as well as to bridge-and-buffer module 215 is router-to-switch (RTS) interface 218. RTS interface 218 includes N/NL switch-interface ports 218.1 and 218.2 and management-interface port 218.3, where the port type of N or NL is determined by negotiation. N type ports may act as a Fibre Channel point to point port, NL type ports may negotiate as a loop.

Switch-interface ports 218.1 and 218.2 are internal Fibre Channel (FC) interfaces through which the router portion conducts I/O operations with the switch portion. When a mapping to a FC storage device is created, the router-switch software automatically selects one of the switch-interface ports to use when accessing the target device. The internal interfaces are selected at random and evenly on a per-LUN (logical unit number) basis, allowing the router-switch to load-balance between the two FC interfaces. The operational status of these internal FC interfaces is monitored by each active SCSI Router application running on the switch-router. The failure of either of these two interfaces is considered a unit failure, and if the switch-router is part of a cluster, all active SCSI Router applications will fail over to another switch-router in the cluster. Other embodiments allow operations to continue with the remaining switch-interface port. Still other embodiments include more than two switch-interface ports.

In the exemplary embodiment, the N/NL switch-interface ports can each use up to 32 World Wide Port Names (WWPNs). The WWPNs for port 218.1 are computed as 28+virtual port+base MAC address, and the WWPNs for port 218.2 are computed as 29+virtual port+base MAC address. Additionally, switch-interface ports 218.1 and 218.2 are hidden from the user. One exception is the WWPN of each internal port. The internal WWPNs are called "initiator" WWPNs. Users who set up access control by WWPN on their FC devices set up the device to allow access to both initiator WWPNs.

Switch-interface port 218.3 is used to exchange configuration data and get operational information from switch portion 220 through its management-interface port 224. In the exemplary embodiment, switch-interface port 218.3 is an 10/100 Ethernet port. In the exemplary embodiment, this exchange occurs under the control of a Switch Management Language (SML) Application Program Interface (API) that is part of interface software 216. One example of a suitable API is available from QLogic Corporation of Aliso Viejo, Calif. Ports 218.1, 218.2, and 218.3 are coupled respectively to FC interface ports 221.1 and 221.2 and interface port 224 of switch portion 220.

Switch portion 220, which in the exemplary embodiment incorporates commercially available technology and supports multiple protocols including IP and SCSI, additionally includes internal FC interface ports 221.1 and 221.2, an FC switch 222, external FC ports (or interfaces) 223.1-223.8, a management interface port 224, and a switch processor module 225.

FC interface ports 221.1 221.2 are coupled respectively to ports of 218.1 and 218.2 of the router-to-switch interface via internal optical fiber links, thereby forming internal FC links. In the exemplary embodiment, each FC interface supports auto-negotiation as either an F or FL port.

FC switch 222, in the exemplary embodiment, incorporates a SANbox2-16 FC switch from QLogic Corporation. This SANbox2 switch includes QLogic's Itasca switch ASIC (application-specific integrated circuit.) Among other things, this switch supports Extended Link Service (ELS) frames that contain manufacturer information.

FC ports 223.1-223.8, which adhere to one or more FC standards or other desirable communications protocols, can be connected as point-to-point links, in a loop or to a switch. For flow control, the exemplary embodiment implements a Fibre Channel standard that uses a look-ahead, sliding-window scheme, which provides a guaranteed delivery capability. In this scheme, the ports output data in frames that are limited to 2148 bytes in length, with each frame having a header and a checksum. A set of related frames for one operation is called a sequence.

Moreover, the FC ports are auto-discovering and self-configuring and provide 2-Gbps full-duplex, auto-detection for compatibility with 1-Gbps devices. For each external FC port, the exemplary embodiment also supports: Arbitrated Loop (AL) Fairness; Interface enable/disable; Linkspeed settable to 1 Gbps, 2 Gbps, or Auto; Multi-Frame Sequence bundling; Private (Translated) Loop mode.

Switch processor module 225 operates the FC switch and includes a switch processor (or controller) 225.1, and associated memory that includes a switch management agent 225.2, and a switch MIB handler 225.3. In the exemplary embodiment, switch processor 225.1 includes an Intel Pentium processor and a Linux operating system. Additionally, processor 225 has its own software image, initialization process, configuration commands, command-line interface, and graphical user interface (not shown). (In the exemplary embodiment, this command-line interface and graphical-user interface are not exposed to the end user.) A copy of the switch software image for the switch portion is maintained as a tar file 226 in bridge-and-buffer module 215 of router portion 210.

Further details on the operation of the above describe system, including high availability embodiments can be found in application Ser. No. 10/128,656, entitled "SCSI-BASED STORAGE AREA NETWORK", application Ser. No. 10/131,793, entitled "VIRTUAL SCSI BUS FOR SCSI-BASED STORAGE AREA NETWORK", and provisional application Ser. No. 60/374,921, entitled "INTERNET PROTOCOL CONNECTED STORAGE AREA NETWORK", all of which have been previously incorporated by reference.

Figure 3A:
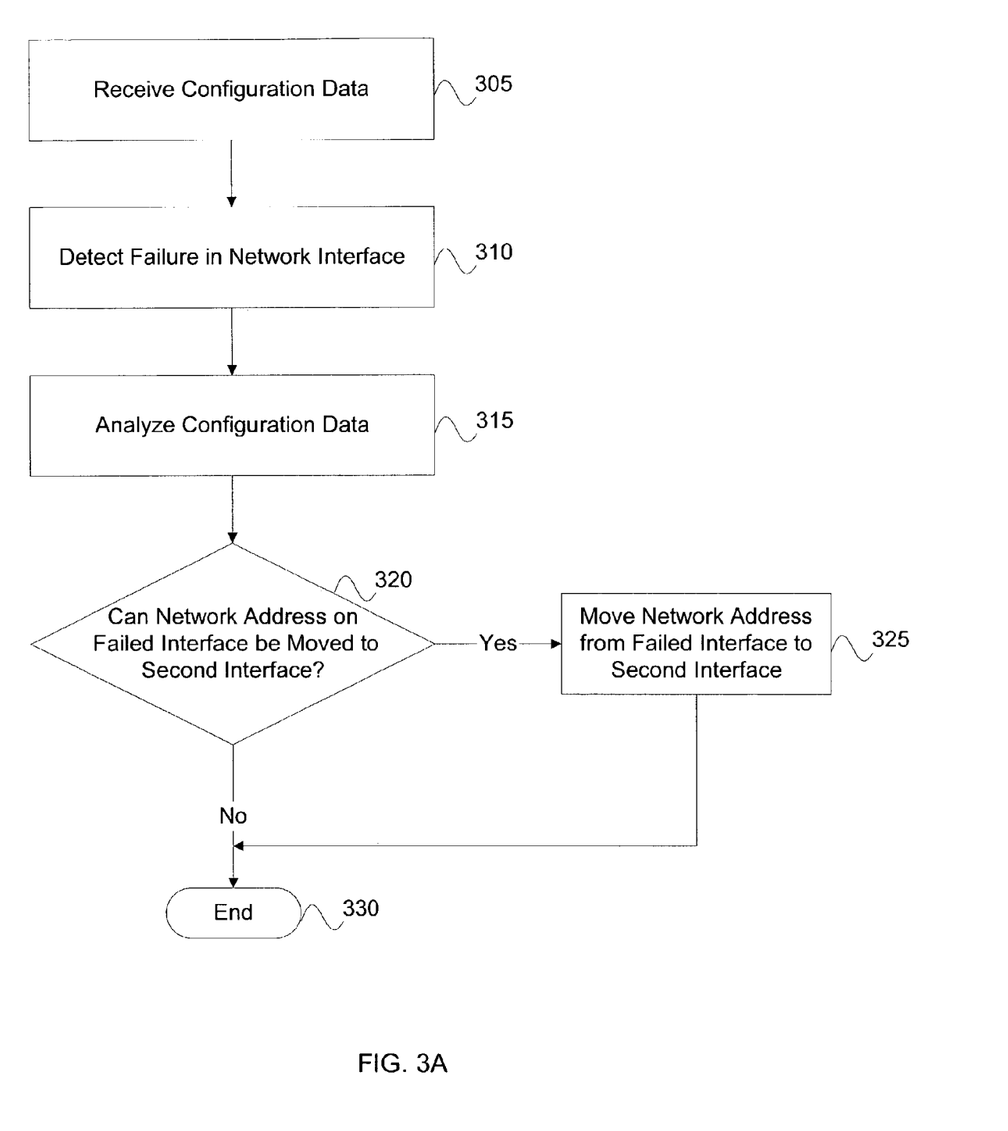
FIG. 3A is a flowchart illustrating a method for failing over a network address according to an embodiment of the invention.
Figure 3B:
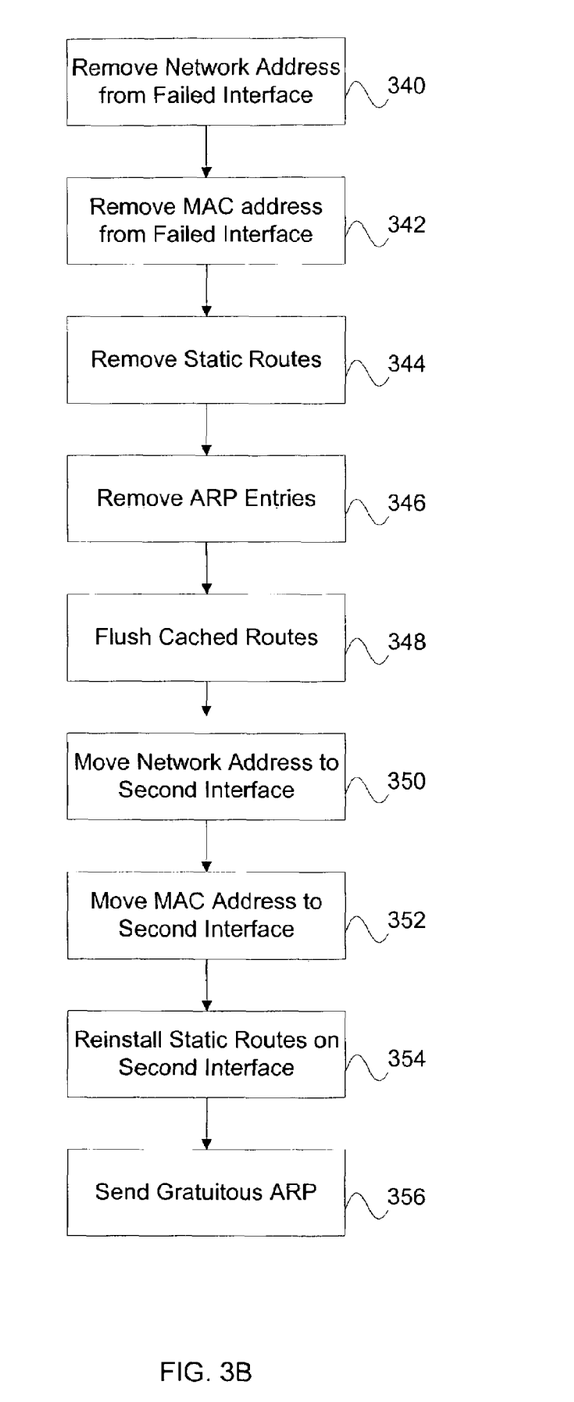
FIG. 3B is a flowchart providing further details on a method moving a network address from a first network interface to a second network interface according to an embodiment of the invention.

FIGS. 3A and 3B are a flowcharts illustrating methods according to embodiments of the invention for providing network address failover capability. The methods to be performed by the operating environment constitute computer programs made up of computer-executable instructions. Describing the methods by reference to a flowchart enables one skilled in the art to develop such programs including such instructions to carry out the methods on suitable computers (the processor or processors of the computer executing the instructions from computer-readable media such as ROM, RAM, CD-ROM, hard disks, signals on network interfaces, etc.). The methods illustrated in FIGS. 3A and 3B are inclusive of acts that may be taken by an operating environment executing an exemplary embodiment of the invention.

FIG. 3A is a flowchart illustrating a method for failing over a network address from a first network interface on an application gateway device to a second network interface on an application gateway device according to an embodiment of the invention. In some embodiments, the network interfaces are Ethernet interfaces such as GE interface 211 described above.

The method begins when a system executing the method receives configuration data (block 305). In some embodiments, the configuration data includes the network addresses for applications running on the application gateway device, and may also include specifications of primary and secondary network interfaces that are to be assigned to the network address. In some embodiments, the network address is an IP network address.

At some point during the operation of the system, the system may detect the failure of a network interface (block 310). The failure may be detected either at startup time, in which case the secondary network interface may be used, or the failure may be detected after startup. In some embodiments of the invention, the failing network interface must be down for two seconds in order for a failure to be determined.

If the failure occurs after startup, the configuration data is analyzed to determine if the network address assigned to the first (failing) network interface can be failed over to the second network interface (block 315). Various embodiments of the invention may use various factors in determining if the network address may be failed over from a first network interface to a second network interface. For example, one factor that may be analyzed is whether or not the network interfaces are connected to the same network. If not, the network address may not be failed over. Additionally, some embodiments of the invention analyze the configuration data to determine if the first and second network interfaces are on the same subnet. If not, the network address may not be failed over.

Additionally, some embodiments of the invention support VLANs (Virtual Local Area Network). In these embodiments, if the first network address and network interface are on a VLAN, the configuration data is analyzed to determine if second network interface can support the same VLAN. If not, the network address may not be failed over to the second network interface. In some embodiments executing the VTP protocol, a switch participating in the VLAN will inform the network interfaces which VLANs are acceptable. In alternative embodiments, the acceptable VLANS are configured.

Furthermore, in clustered environments, such as those described in FIG. 1B above, the system checks to see if the network address is in use by another application gateway device in the cluster. If so, the network address may not be failed over to the second network interface.

A further check performed by some embodiments of the invention is to determine if the second network interface can support an additional network address. In some embodiments, each network interface can support up to fifteen network addresses. If the second network interface is at the maximum, the network address may not be failed over.

Similarly, the system may check to determine if the second network interface can support an additional MAC address. If not, the network address may not be failed over.

After analyzing the configuration data as described above, the system will determine if the network address can be failed over from a failed first network interface to a second network interface (block 320). If so, the network address is moved to the second network interface (block 325) and applications using the first network interface continue to operate as if the failure did not occur (note that some data may need to be retransmitted, however this is typically handled by the network protocol layers and is typically transparent to the application). If not, the network address remains associated with the first network interface and the application may no longer be able to send or receive data to and from the network.

FIG. 3B is a flowchart providing further details for block 325 above comprising a method for moving a network address from a first network interface to a second network interface according to an embodiment of the invention. The method begins by removing the network address from the failing first interface (block 340). In some embodiments, the network address is an IP address. In addition, a MAC address associated with the network address may also be removed (block 342).

Additionally, any static routes associated with the network address are removed from routing tables on the system (block 344).

In some embodiments of the invention, ARP (Address Resolution Protocol) entries associated with the first network address are removed from the system (block 346).

Finally, in some embodiments, any cached routes associated with the network address are flushed (i.e. removed) from the system (block 348). In some embodiments, cached routes associated with TCP, UDP and IP protocols are flushed.

The system then proceeds to prepare to associate the network address with the second network interface. The network address is assigned to the second network interface (block 350). In some embodiments, the MAC address that was associated with the network address on the first interface is moved to the second interface (block 352).

In some embodiments, the static routes that were removed at block 344 above are reinstalled on the system and associated with the second network interface (block 354).

In those embodiments supporting VLANS, if the first network interface was participating in a VLAN, then the VLAN logical interfaces are deleted from the first network interface and established on the second network interface if necessary.

Finally, in some embodiments of the invention, a gratuitous ARP packet is issued by the second network interface (block 356). The packet is gratuitous in that it is not issued in response to an ARP request. The gratuitous ARP is desirable, because it causes other network elements in the network such as switches and routers to update their respective ARP tables more quickly than they would through normal address resolution mechanisms that rely on timeouts.

It should be noted that the tasks performed above need not be performed in the order indicated in the flowchart. Additionally, various embodiments of the invention need not perform each and every task noted above.

CONCLUSION

Systems and methods for failing over a network address from a first network interface to a second network interface have been described. The embodiments of the invention provide advantages over previous systems. For example, by transferring the network address from one network interface to another, the failover may be transparent to the applications and hosts communicating with the applications, thus resulting in less disruption on the network.

While the embodiments of the invention have been described as operating in a storage router environment, the systems and methods may be applied to variety of application gateway devices, including switches, routers, personal computers, laptop computers, server computers etc. that have more than one network interface. This application is intended to cover any adaptations or variations of the present invention. The terminology used in this application is meant to include all of these environments. It is to be understood that the above description is intended to be illustrative, and not restrictive. Many other embodiments will be apparent to those of skill in the art upon reviewing the above description. Therefore, it is manifestly intended that this invention be limited only by the following claims and equivalents thereof.

What is claimed is:

1. A method for providing failover for a network address in an application gateway device having a first network interface and at least a second network interface, the method comprising:

receiving a set of configuration data for the application gateway device, the configuration data including a first network address for the first network interface and a second network address for the second network interface;

detecting a failure in the first network interface; and analyzing the configuration data to determine if the first network address can be used on the second network interface; and if so, moving the first network address to the second network interface.

2. The method of claim 1, wherein the network address is an IP (Internet Protocol) address.

3. The method of claim 2, further comprising determining if the second network interface will support an additional MAC (Media Access Control) address to be associated with the first IP address.

4. The method of claim 1, wherein analyzing the configuration data includes determining if the first network address and the second network address are on the same network.

5. The method of claim 1, wherein analyzing the configuration data includes determining if the first network address and the second network address are on the same subnet.

6. The method of claim 1, further comprising determining if the second network interface is capable of adding the first network address.

7. The method of claim 1, further comprising issuing a gratuitous ARP (Address Resolution Protocol) packet.

8. The method of claim 1, further comprising determining if another application gateway device on the network is configured to use the first network address.

9. The method of claim 1, further comprising determining if the second network interface can support a VLAN (Virtual Local Area Network) associated with the first network address.

10. The method of claim 1, wherein the network interface is an Ethernet interface.

11. The method of claim 10, wherein moving the first network address to the second network interface comprises:

removing the network address from the first interface;

removing a MAC address associated with the network address from a static routing table associated with the first interface;

moving the network address and the MAC address to the second network interface; and reinstalling the static routing table on the second network interface.

12. The method of claim 10, further comprising:

removing at least one ARP entry for at least one host on a subnet associated with the first network address.

13. The method of claim 10, further comprising flushing cached routes for TCP, UDP and IP protocols.

14. The method of claim 10, further comprising issuing a gratuitous ARP packet.

15. The method of claim 1, wherein analyzing the configuration includes determining if the network address is in use by another application gateway device on a network communicatively coupled to the first and second network interfaces.

16. An application gateway device comprising:

a processor;

a memory;

an operating system executed by the processor from the memory; and a first network interface having a first network address and a second network interface having a second network address;

wherein the operating system is operable to detect the failure of the first network interface and to analyze a set of configuration data to determine if the first network address can be used on the second network interface; and if so, moving the first network address to the second network interface.

17. The application gateway device of claim 16, wherein the network interface is an Ethernet interface.

18. The application gateway device of claim 16, wherein the network address is an IP address.

19. The application gateway device of claim 16, wherein the operating system is further operable to determine if the second network interface will support an additional MAC (Media Access Control) address to be associated with the first IP address.

20. The application gateway device of claim 16, wherein the operating system is further operable to determine if the second network interface is capable of adding the first network address.

21. The application gateway device of claim 16, wherein the operating system is further operable to determine if another application gateway device on the network is configured to use the first network address.

22. A computer-readable medium having computer executable instructions for performing a method for providing failover for a network address in an application gateway device having a first network interface and at least a second network interface, the method comprising:
receiving a set of configuration data for the application gateway device, the configuration data including a first network address for the first network interface and a second network address for the second network interface;
detecting a failure in the first network interface; and
analyzing the configuration data to determine if the first network address can be used on the second network interface; and if so, moving the first network address to the second network interface.

23. The computer-readable medium of claim 22, wherein the network address is an IP (Internet Protocol) address.

24. The computer-readable medium of claim 23, wherein the method further comprises determining if the second network interface will support an additional MAC (Media Access Control) address to be associated with the first IP address.

25. The computer-readable medium of claim 22, wherein analyzing the configuration data includes determining if the first network address and the second network address are on the same network.

26. The computer-readable medium of claim 22, wherein analyzing the configuration data includes determining if the first network address and the second network address are on the same subnet.

27. The computer-readable medium of claim 22, wherein the method further comprises determining if the second network interface is capable of adding the first network address.

28. The computer-readable medium of claim 22, wherein the method further comprises issuing a gratuitous ARP (Address Resolution Protocol) packet.

29. The computer-readable medium of claim 22, wherein the method further comprises determining if another application gateway device on the network is configured to use the first network address.

30. The computer-readable medium of claim 22, wherein the method further comprises determining if the second network interface can support a VLAN (Virtual Local Area Network) associated with the first network address.

31. The computer-readable medium of claim 22, wherein the network interface is an Ethernet interface.

32. The computer-readable medium of claim 31, wherein moving the first network address to the second network interface comprises:
removing the network address from the first interface;
removing a MAC address associated with the network address from a static routing table associated with the first interface;
moving the network address and the MAC address to the second network interface; and
reinstalling the static routing table on the second network interface.

33. The computer-readable medium of claim 31, wherein the method further comprises removing at least one ARP entry for at least one host on a subnet associated with the first network address.

34. The computer-readable medium of claim 31, wherein the method further comprises flushing cached routes for TCP, UDP and IP protocols.

35. The computer-readable medium of claim 31, wherein the method further comprises issuing a gratuitous ARP packet.

36. The computer-readable medium of claim 31, wherein analyzing the configuration includes determining if the network address is in use by another application gateway device on a network communicatively coupled to the first and second network interfaces.

37. A system for providing failover for a network address in an application gateway device having a first network interface and at least a second network interface, the system comprising:
means for receiving a set of configuration data for the application gateway device, the configuration data including a first network address for the first network interface and a second network address for the second network interface;
means for detecting a failure in the first network interface; and
means for analyzing the configuration data to determine if the first network address can be used on the second network interface; and if so, moving the first network address to the second network interface.

38. The system of claim 37, further comprising means for determining if the second network interface will support an additional MAC (Media Access Control) address to be associated with the first IP address.

39. The system of claim 37, wherein the means for analyzing the configuration data determines if the first network address and the second network address are on the same network.

40. The system of claim 37, wherein the means for analyzing the configuration data determines if the first network address and the second network address are on the same subnet.

41. The system of claim 37, further comprising means for determining if the second network interface is capable of adding the first network address.

* * * * *